United States Patent
Agiwal

(10) Patent No.: US 11,652,911 B2
(45) Date of Patent: *May 16, 2023

(54) HANDLING DIFFERENT PROTOCOL DATA UNIT TYPES IN A DEVICE TO DEVICE COMMUNICATION SYSTEM

(71) Applicant: Samsung Electronics Co., Ltd., Suwon-si (KR)

(72) Inventor: Anil Agiwal, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/214,683

(22) Filed: Mar. 26, 2021

(65) Prior Publication Data

US 2021/0218832 A1  Jul. 15, 2021

Related U.S. Application Data

(63) Continuation of application No. 16/680,175, filed on Nov. 11, 2019, now Pat. No. 10,965,791, which is a
(Continued)

(30) Foreign Application Priority Data

Sep. 12, 2014 (IN) .......................... 4479/CHE/2014
Aug. 3, 2015 (IN) .......................... 4479/CHE/ 2014
Sep. 4, 2015 (KR) ........................ 10-2015-0125591

(51) Int. Cl.
  *H04W 4/00* (2018.01)
  *H04W 4/70* (2018.01)
  (Continued)

(52) U.S. Cl.
  CPC .............. *H04L 69/22* (2013.01); *H04W 4/70* (2018.02)

(58) Field of Classification Search
  CPC .... H04L 69/22; H04W 8/005; H04W 28/065; H04W 48/10; H04W 4/005; H04W 4/70;
  (Continued)

(56) References Cited

U.S. PATENT DOCUMENTS 7,647,429 B2 * 1/2010 Lee ........................ H04W 28/06
                                                                  709/204
8,305,965 B2 * 11/2012 Shen .................... H04B 7/2606
                                                                  370/348
(Continued)

FOREIGN PATENT DOCUMENTS

KR    10-2007-0096921 A    10/2007
KR       10-0968037 B1      7/2010
(Continued)

OTHER PUBLICATIONS

Decision of Grant dated Nov. 22, 2021, in connection with Korean Application No. 10-2015-0125591, 6 pages.

*Primary Examiner* — Ahmed Elallam

(57) ABSTRACT

A method and system for differentiating different Protocol Data Units (PDU) in a D2D communication network. The type of PDU to be differentiated is assigned/associated with a unique data/value and transmitted to the destination, by a transmitting User Equipment. At the receiving end, the receiving User Equipment differentiates between different types of PDU packets received, based on the unique data associated with the collected data. Further, the received PDU data is processed based on a suitable packet processing function that matches the PDU type of the PDU data received.

20 Claims, 7 Drawing Sheets

Related U.S. Application Data continuation of application No. 16/123,958, filed on Sep. 6, 2018, now Pat. No. 10,659,572, which is a continuation of application No. 14/851,354, filed on Sep. 11, 2015, now Pat. No. 10,110,713.

(51) Int. Cl.
*H04W 28/06* (2009.01)
*H04L 69/22* (2022.01)

(58) Field of Classification Search
CPC ... H04W 72/12; H04W 76/043; H04W 80/02; H04W 80/04; H04W 92/18
See application file for complete search history.

(56) References Cited

U.S. PATENT DOCUMENTS

| | | | |
|---|---|---|---|
| 8,958,422 B2 * | 2/2015 | Celik | H04L 1/1841 370/389 |
| 9,144,098 B2 | 9/2015 | Hakola et al. | |
| 9,730,104 B2 * | 8/2017 | Yi | H04L 69/04 |
| 9,980,173 B2 | 5/2018 | Lee et al. | |
| 10,110,713 B2 | 10/2018 | Agiwal | |
| 10,154,402 B2 | 12/2018 | Agiwal et al. | |
| 10,485,018 B2 * | 11/2019 | Agiwal | H04W 72/1289 |
| 10,547,377 B2 * | 1/2020 | Yi | H04W 28/06 |
| 10,554,791 B2 | 2/2020 | Pang et al. | |
| 10,623,532 B2 | 4/2020 | Yi et al. | |
| 10,630,819 B2 * | 4/2020 | Sammour | H04L 1/1874 |
| 10,659,572 B2 | 5/2020 | Agiwal | |
| 10,764,793 B2 * | 9/2020 | Ahluwalia | H04L 1/1671 |
| 10,965,791 B2 * | 3/2021 | Agiwal | H04L 69/22 |
| 2005/0201353 A1 | 9/2005 | Lee et al. | |
| 2007/0291788 A1 | 12/2007 | Sammour et al. | |
| 2010/0265873 A1 | 10/2010 | Yi et al. | |
| 2013/0287012 A1 | 10/2013 | Pragada et al. | |
| 2015/0085697 A1 | 3/2015 | Gulati et al. | |
| 2015/0215760 A1 | 7/2015 | Wei et al. | |
| 2016/0127309 A1 | 5/2016 | Yun et al. | |
| 2016/0183276 A1 | 6/2016 | Marinier et al. | |
| 2016/0338082 A1 | 11/2016 | Yi et al. | |
| 2017/0013497 A1 | 1/2017 | Lee et al. | |
| 2017/0013634 A1 | 1/2017 | Tsuboi et al. | |
| 2017/0034862 A1 | 2/2017 | Ma et al. | |
| 2017/0041972 A1 | 2/2017 | Yi et al. | |
| 2017/0048643 A1 | 2/2017 | Lee et al. | |
| 2017/0048922 A1 | 2/2017 | Lee et al. | |
| 2017/0127471 A1 | 5/2017 | Yu et al. | |
| 2018/0205807 A1 | 7/2018 | Yi et al. | |

FOREIGN PATENT DOCUMENTS

| | | | | |
|---|---|---|---|---|
| KR | 10-1373359 B1 | 4/2014 | | |
| WO | WO-2015139324 A1 * | 9/2015 | ............ | H04L 69/04 |

* cited by examiner

HANDLING DIFFERENT PROTOCOL DATA UNIT TYPES IN A DEVICE TO DEVICE COMMUNICATION SYSTEM

CROSS-REFERENCE TO RELATED APPLICATIONS

The present application is a continuation of U.S. patent application Ser. No. 16/680,175 filed on Nov. 11, 2019, which is a continuation of U.S. patent application Ser. No. 16/123,958 filed on Sep. 6, 2018 now U.S. Pat. No. 10,659,572 issued on May 19, 2020, which is a continuation of U.S. patent application Ser. No. 14/851,354 filed on Sep. 11, 2015 now U.S. Pat. No. 10,110,713 issued on Oct. 23, 2018, which is based on and claims priority under 35 U.S.C. § 119 to Indian Provisional Patent Application No. 4479/CHE/2014 filed on Sep. 12, 2014, Indian Complete Patent Application No. 4479/CHE/2014 filed on Aug. 3, 2015, and Korean Patent Application No. 10-2015-0125591 filed on Sep. 4, 2015, the disclosures of which are herein incorporated by reference in their entirety.

BACKGROUND

1. Field

The embodiments herein relate to Device to Device (D2D) communication system and, more particularly, to handle different Protocol Data Units (PDU) in the D2D communication system.

2. Description of Related Art

Device to Device (D2D) communication allows direct communication between different User Equipments (UEs). During the D2D communication a transmitting D2D UE can transmit data packets to a group of D2D UEs or broadcast data packets to all the D2D UEs or send unicast data packets to a specific D2D UE. D2D communication between the transmitter and receiver(s) is connectionless in nature i.e. there is no connection setup (or no control messages are exchanged) between the transmitter and receiver before the transmitter starts transmitting the data packets. During the transmission, the transmitter includes the source ID and the destination ID in the data packets. The source ID is set to the UE ID of the transmitter. The destination ID is of the intended recipient of the transmitted packet. The destination ID indicates whether the packet is a broadcast packet or a unicast packet or a packet intended for a group.

A D2D communication may involve transmission of different traffic types (e.g. ARP, IP etc) to the same or different destination, wherein packets belonging to different types of traffic needs to be processed differently in transmitting UE and receiving UE involved in D2D communication. In the transmitter, higher layer (IP Protocol) provides the IP packets to lower layer (PDCP/RLC) for transmitting to one or more UEs. Lower layer processes the packet and transmits the processed packet on D2D communication channel. The receiver receives the packet on D2D communication channel. The lower layer (PDCP/RLC) processes the packet and sends it to higher layer. A disadvantage of the existing D2D communication systems is that the upper layers & lower layers always identify the packet as IP packet and processes it accordingly. As a result packet types cannot be exchanged between devices.

SUMMARY

To address the above-discussed deficiencies, it is a primary object to differentiate between different PDU data type, based on at least one data that indicates the type of PDU data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
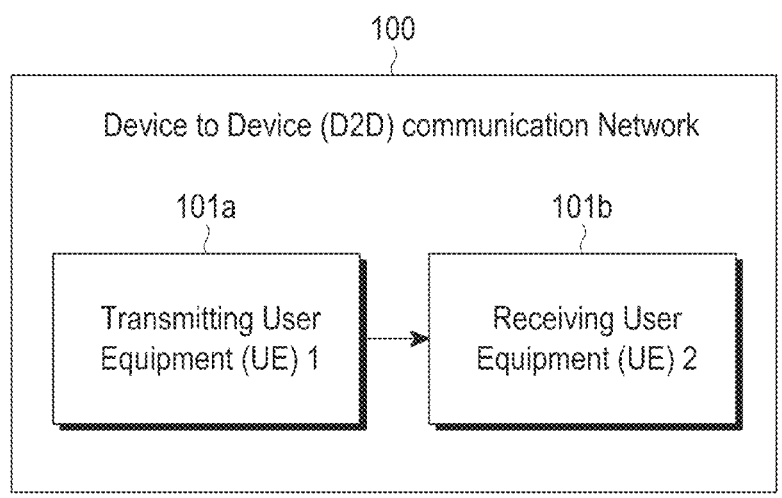
FIG. 1 illustrates a block diagram of the Device to Device (D2D) communication network, as disclosed in the embodiments herein.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged telecommunication technologies. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein disclose a mechanism for differentiating different PDU packets exchanged between the User Equipments (UEs) involved in Device to device (D2D) communication. Referring now to the drawings, and more particularly to FIGS. 1 through 7, where similar reference characters denote corresponding features consistently throughout the figures, there are shown embodiments.

FIG. 1 illustrates a block diagram of the Device to Device (D2D) communication network, as disclosed in the embodiments herein. The D2D communication network 100 comprises of at least two User Equipments 101, wherein one UE acts as a transmitting UE 101a, and the other as a receiving UE 101b. In an embodiment, each UE 101 can be configured to transmit and receive data as part of communication with at least one other UE 101, wherein the data can be user data, control data, and associated Protocol Data Units (PDU). The UE 101 can be any device that can be configured to perform D2D communication with at least one other UE, wherein the D2D communication involves differentiation between different PDU data types by the UE 101. For example of the UE 101 can be a smart phone, tablet, and a wearable device and so on.

The transmitting UE 101a can be configured to identify the data packet type (or PDU type) of data to be transmitted to the receiving UE 101b. The transmitting UE 101a can be further configured to map data associated with one or more PDU types to a D2D radio bearer. The transmitting UE 101a can be further configured to create a new D2D radio bearer for communicating the data to the receiving UE 101b, if a D2D radio bearer does not exist already. The transmitting UE 101a can be further configured to add a value/data that is unique to the type of PDU data type being transmitted. The transmitting UE 101a can be further configured to transmit the data along with the unique value, to the receiving UE 101b. For example, the PDU data type can be ARP (Address Resolution Protocol) packet i.e. ARP PDU, IP (Internet Protocol) packet i.e. IP PDU, discovery message, control signaling message, relay packet and so on. By adding a unique value/data that is specific to at least one of the aforementioned PDU type and by sharing the data with the receiving UE 101b, the transmitting UE 101a can enable the receiving UE 101b to identify the type of PDU packet received. The transmitting UE 101a can be further configured to apply a packet processing functions that matches the type of PDU data, and then transmit the data to selected destination (In this scenario, the receiving UE 101b).

The receiving UE 101b can be configured to receive the data transmitted by the transmitting UE 101a. The receiving UE 101b further identifies the type of PDU data being received based on the unique value/data included in the message. The lower layer in the protocol stack of the receiving UE 101b identifies the type of PDU packet received, applies one or more packet processing functions that matches the type of PDU received and informs at least one of the upper layers of the protocol stack, of the type of PDU received.

Figure 2:
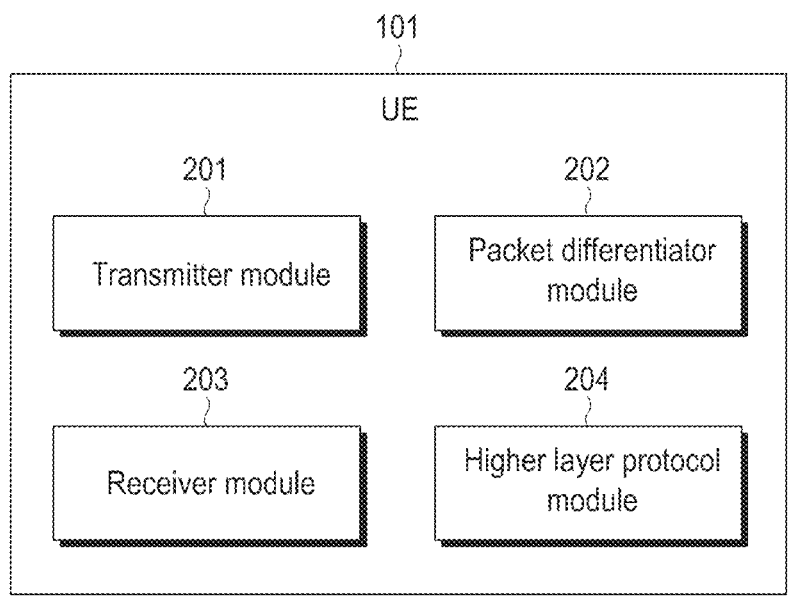
FIG. 2 is a block diagram that shows components of a User Equipment (UE) in the D2D communication network, as disclosed in the embodiments herein.

FIG. 2 is a block diagram that shows components of a User Equipment (UE) in the D2D communication network, as disclosed in the embodiments herein. The UE 101 comprises of a transmitter module 201, a packet differentiator module 202, a receiver module 203, and a higher layer protocol module 204.

The transmitter module 201 can be configured to communicate with the packet differentiator module 202 and collect information pertaining to the type of packet to be transmitted. The transmitter module 201 further collects information pertaining to one or more packet processing functions that matches the type of data to be transmitted. Further, the transmitter module 201 applies the one or more packet processing functions to the data and transmits the data to the receiving UE 101b. The transmitter module 201 can be configured to use any suitable communication technology and protocol so as to establish communication with the receiving UE 101b, using at least one suitable D2D radio bearer. The transmitter module 201 can be configured to select the matching D2D radio bearer from available D2D radio bearers, if the matching D2D radio bearer already exists, or to create a new D2D bearer if the matching D2D radio bearer does not exist.

The packet differentiator 202 can be configured to perform at least two main functions, preferably based on the role of the UE 101 in which it resides in the communication process. In the transmitting UE 101a, the packet differentiator 202 identifies the PDU type and selects one or more packet processing functions that matches the identified PDU type. The packet differentiator 202 further communicates the PDU type and the matching packet functions to the transmitter module 201 and prompts the transmitter module 201 to process the data, based on the selected one or more packet processing functions. The transmitter module 201 also adds a value/data that is unique to the type of PDU data type being transmitted. The transmitter module 201 then transmits the processed data along with the unique value, to the receiving UE 101b. In the receiving UE 101b, the packet differentiator 202 processes the data received from the transmitting UE 101a, and identifies the type of data i.e. PDU type, based on the unique value i.e. the differentiator present in the data/message received from the transmitting UE 101a.

The receiving module 203 can be configured to collect the data being transmitted by the transmitting UE 101a and provides the collected data to the packet differentiator 202 in the receiving UE 101. The receiving module 203 further collects information pertaining to the type of the PDU received. Lower layer of the Packet Data Convergence Protocol/Radio Link Control (PDCP/RLC) layer in the receiving UE 101b collects the PDU type information and communicates the PDU type information to the higher layers.

The higher layer protocol module 204 is configured to host at least one sub-module that can generate at least one type of PDU data. For example, the higher layer protocol module 204 comprises of an ARP protocol sub-module, IP protocol sub-module, Discovery protocol sub-module, and Signaling Protocol sub-module. The ARP protocol sub-module generates ARP packets to be transmitted to one or more UEs. IP protocol sub-module generates IP packets to be transmitted to one or more UEs. Discovery protocol sub-module generates discovery messages to be transmitted to one or more UEs. Signaling protocol sub-module generates control signaling messages to be transmitted to one or more UEs. The higher layer protocol module 204 further associates the data with a destination ID and PDU type, and shares the data with the transmitter module 201 in the transmitting UE 101*a*.

Figure 3:
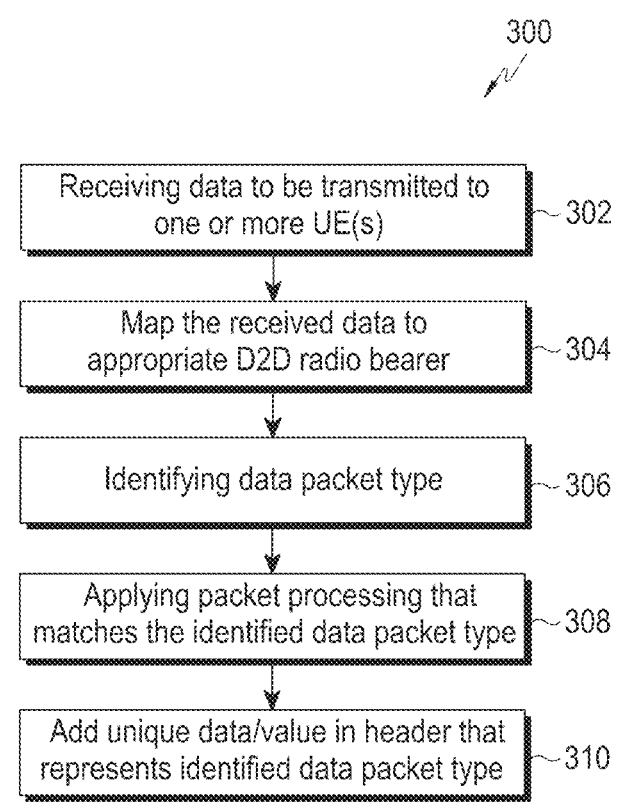
FIG. 3 is a flow diagram that depicts steps involved in the process of transmitting at least one PDU data from the UE in the D2D communication network, as disclosed in the embodiments herein.

FIG. 3 is a flow diagram that depicts steps involved in the process of transmitting at least one PDU data from the UE in the D2D communication network, as disclosed in the embodiments herein. The transmitter module 201 in the transmitting UE 101*a* receives 302 from higher layer protocol module 204 the data to be transmitted to the receiving UE 101*b*. The higher layer protocol module is one of ARP protocol module, IP protocol module, Discovery protocol module, Signaling Protocol module. ARP protocol module generates ARP packets to be transmitted to one or more UEs. IP protocol module generates IP packets to be transmitted to one or more UEs. Discovery protocol module generates discovery messages to be transmitted to one or more UEs. Signaling protocol module generates control signaling messages to be transmitted to one or more UEs. The data received from higher layer protocol module 204 is associated with at least a destination ID and PDU type. The destination ID and PDU type associated with data is received by the transmitter module 201 in the transmitting UE 101*a* from the higher layer protocol module. The destination ID identifies the destination to which the data is to be transmitted. The destination can be another UE (i.e. destination ID equals UE ID) or a group of UEs (i.e. destination ID equals group ID) or all UEs in the vicinity (i.e. destination ID equals broadcast ID).

The PDU type identifies the type of data. For example, the PDU type can be ARP packet, IP packet, discovery message, control signaling message, relay packet and so on. The transmitter module 201 in the transmitting UE 101*a* maps (304) the data associated with destination ID and PDU type to an appropriate D2D radio bearer. In an embodiment, data associated with different destination ID is mapped to different D2D radio bearer. Data of all PDU types for a destination ID is mapped to the same D2D radio bearer. For example, data (of any PDU type) for destination ID1 is mapped to D2D radio bearer 1, data (of any PDU type) for destination ID2 is mapped to D2D radio bearer 2 and so on. The benefit of this approach is that less number of D2D radio bearers needs to be maintained in the D2D communication network. In another embodiment data associated with different destination ID is mapped to different D2D radio bearer. Data of different PDU types for the same destination ID is also mapped to the different D2D radio bearer. For example, data of PDU type equals ARP for destination ID1 is mapped to D2D radio bearer 1, data of PDU type equals IP for destination ID1 is mapped to D2D radio bearer 2, data of PDU type equals ARP for destination ID2 is mapped to D2D radio bearer 3, data of PDU type equals IP for destination ID2 is mapped to D2D radio bearer 4 and so on. The benefit of this approach is that different PDU types can be provided different quality of service. For example, ARP packets can be prioritized over IP packets. In order to map the data to appropriate D2D radio bearer, the transmitter module 201 in the transmitting UE 101*a* checks if a D2D radio bearer exists for processing the data associated with destination ID and PDU type. The transmitter module 201 in the transmitting UE 101*a* creates a D2D radio bearer (i.e. PDCP entity and RLC entity) for processing the data associated with destination ID and PDU type, if a D2D radio bearer does not already exist for processing data associated with destination ID and PDU type. If the D2D radio bearer already exists, then the UE 101*a* selects the bearer that matches the destination ID and PDU Type of data that needs to be transmitted.

The packet differentiator module 202 in the transmitting UE 101 identifies 306 the data packet type (or PDU type). The PDU type can be IP, ARP (Address Resolution Protocol), discovery message, control signaling message, relayed packet and so on. In various embodiments, the D2D communication network 100 can be configured to add a unique value/data with at least one of the available PDU types, such that the receiving UE 101*b* can differentiate between the types of PDUs. In one embodiment, the packet differentiator module can be implemented in PDCP.

Further, the transmitter module 201, based on the information pertaining to the PDU type of the data, selects the packet processing functions (ROHC, Security, sequence numbering) that matches the identified PDU type, and applies 308 the selected packet processing functions to the data. For example, if PDU type is ARP then ROHC function is not applied whereas ROHC function is applied for data associated with PDU type equals IP. Further the transmitter module 201 of the transmitting UE 101*a* adds 310 at least one unique data/value that represents the PDU type of the data, to the data.

In an embodiment, in order to enable the receiving UE 101*b* to identify the PDU type, one or more LCIDs are reserved for each PDU type and LCID is assigned to each D2D radio bearer according to PDU type processed by it. LCID is the logical channel ID of logical channel to which a D2D radio bearer is mapped in lower layers. There is one to one mapping between logical channel and D2D radio bearer. LCID is added in the PDU header. The header can be one of PDCP/RLC/MAC header. The benefit of this approach is that new header filed is not needed as LCID field is already present in the PDU header. In another embodiment, wherein data packets of distinct PDU types can be mapped to same D2D radio bearer, PDU type field is added in PDU header to identify the PDU type. The header can be one of PDCP/RLC/MAC header. The benefit of this approach is that multiple D2D radio bearers are not required to be maintained for each destination and hence reduced complexity. In another embodiment, wherein data packets of PDU type equals to IP and Non IPs are mapped to distinct D2D radio bearer, one or more LCIDs are reserved for IP and non IP packets and LCID is assigned to each D2D radio bearer according to whether it is processing IP packets or non IP packets. A PDU type field is added in header of PDCP PDU or MAC PDU to identify the PDU type of each non IP data. Non IP data is one of ARP packet or discovery message or control signaling message.

Transmitter operation in one embodiment: Assigning Separate Radio Bearers for ARP packets and IP packets.

Figure 5:
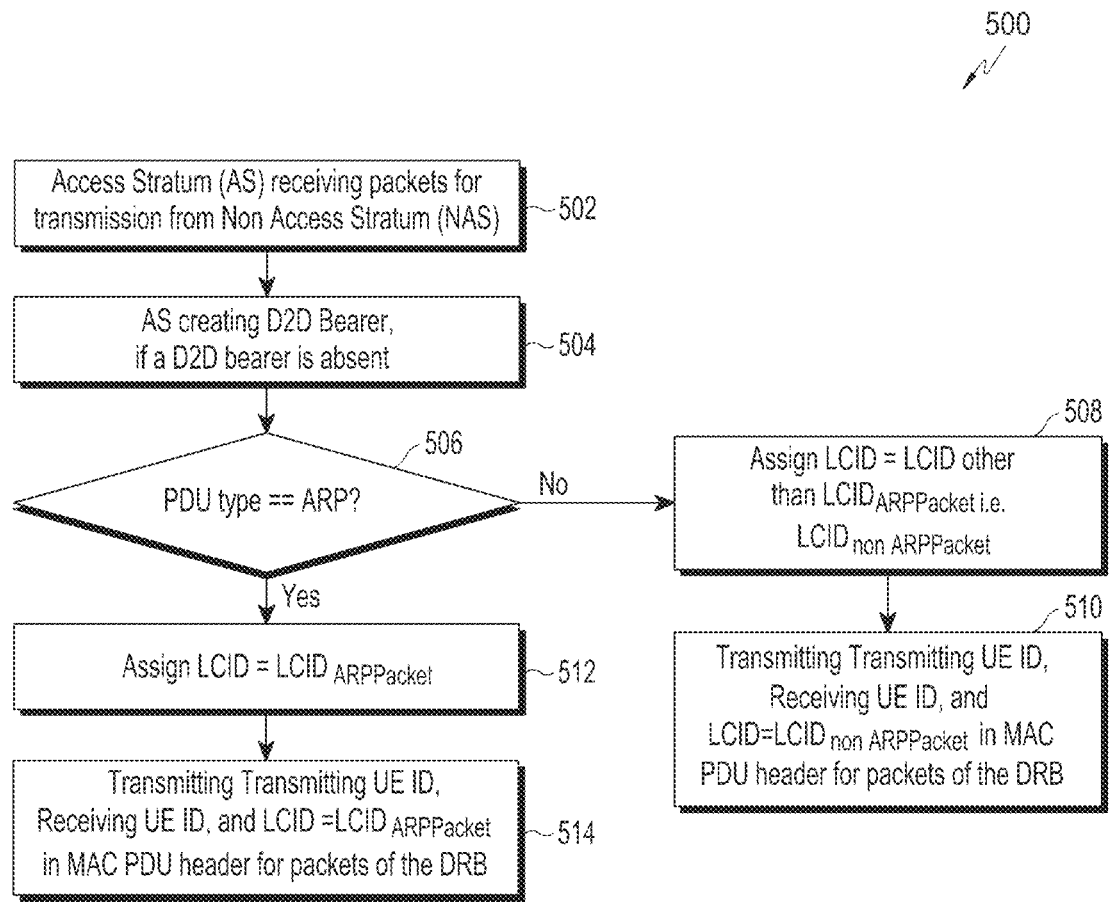
FIG. 5 is an example flow diagram that depicts steps involved in the process of processing Address Resolution Protocol (ARP) packets differently from other types of packets, by a transmitting UE in the D2D communication network, as disclosed in the embodiments herein.

In this scenario as depicted in FIG. 5, the transmitting module 201 of the transmitting UE 101*a* receives 502 packets from higher layer protocol module for transmission. The transmitting module 201 further creates 504 a separate D2D radio bearer (or PDCP/RLC entity) for transmission of the ARP packets AS receives the destination ID and PDU type along with packet from higher layer protocol module 204. In an embodiment, various PDCP/RLC entities can be created/exist such that each PDCP/RLC entity carries PDCP/RLC packets to different destinations, using at least one mode of transmission of data such as but not limited to unicast, multicast, broadcast and so on. Further, an $LCID_{ARPPkts}$ is reserved from LCID space to differentiate a PDCP/RLC entity that carries ARP packets from a PDCP/RLC entity that carries at least one other type of PDCP/RLC packet.

In an embodiment if ARP packets are only broadcasted, then reserved $LCID_{ARPPkts}$ is not used/assigned for identification of PDCP/RLC entity carrying broadcast IP packets. The reserved $LCID_{ARPPkts}$ can be used or assigned for identification of PDCP/RLC entity carrying unicast or group cast IP packets.

In this scenario, if the PDU is identified as of ARP type, then the packet processing that matches the ARP packets is applied 512 & 514. In an example embodiment, the packet processing function that matches the ARP packets can have the following characteristics: Header compression function is not applied (i.e. No Robust Header Compression (ROHC)) by the corresponding PDCP entity; Security is applied according to destination ID by the corresponding PDCP entity; Source UE ID, Destination ID and $LCID_{ARPPkts}$ identifies the created D2D radio bearer i.e. PDCP entity and RLC entity wherein $LCID_{ARPPkts}$ is a predefined LCID for ARP packets.

Source UE ID, Destination ID and LCID are transmitted in MAC PDU header carrying this packet wherein $LCID_{ARPPkts}$ is a predefined LCID for ARP packets.

If the PDU is has been identified as a non ARP packet, i.e. IP type in this scenario, then at least one corresponding packet processing function is applied 508&510. The packet processing function for an IP PDU can have the following characteristics:
Header compression function is applied (i.e. Robust Header Compression (ROHC) is applied) by the corresponding PDCP entity;
Security is applied according to destination ID by the corresponding PDCP entity;
Source UE ID, Destination ID and LCID (unused LCID from LCID set for IP packets) identifies the created D2D radio bearer i.e. PDCP entity and RLC entity wherein LCID is any unused LCIDs from set of LCIDs for IP packets;
Source UE ID, Destination ID and LCID is transmitted in MAC PDU header carrying this packet wherein LCID is any unused LCIDs from set of LCIDs for IP packets.

In an alternate embodiment instead of reserving LCID for ARP packet, a PDU type field can be added in the PDU header. The header can be PDCP header or MAC PDU header. The PDU type distinguishes whether packet is IP or ARP. PDU type can also distinguish other type of PDUs i.e. discovery message, control signaling message, relay packet, secured or unsecured IP packet and so on.

The operation is described for ARP and IP packets. However the same can be applied for multiple PDU types. In an alternate embodiment, if there are multiple different PDU types other than IP packet, then an LCID can be reserved for each of those PDU types. The transmitter module 201 creates a separate PDCP/RLC entity for transmission of packets of each PDU type. In one embodiment only one PDCP/RLC entity for transmitting packets of a specific PDU type is created. In another embodiment, multiple PDCP/RLC entities for transmitting packets of a PDU type can exists wherein each PDCP/RLC entity carry packets of a PDU type for different destination (e.g. broadcast, unicast, group cast). One or more LCIDs are reserved from the LCD space for D2D communication for each PDU type. The MAC SDUs carrying packet of a specific PDU Type is identified by the LCD reserved for that PDU type in MAC PDU.

Transmitter operation in a second embodiment: Assigning Separate Radio Bearers for IP packets and Non IP packets.

In this scenario, the transmitting module 201 of the transmitting UE 101a creates a separate PDCP/RLC entity for transmission of packets other than the IP packets. In another embodiment, multiple PDCP/RLC entities for transmission of packets other than IP packets can exists wherein each PDCP/RLC entity carry non IP packets for different destination. PDCP/RLC entity carrying non IP packets is identified by Source ID, Destination ID, and $LCID_{NonIPPkts}$. A LCID ($LCID_{NonIPPkts}$) is reserved to distinguish the PDCP/RLC entity carrying non IP packets from PDCP/RLC entity carrying IP packets. The PDCP/RLC entity for IP and non IP packets are mapped to different logical channels. The MAC SDUs carrying non IP packet is identified by the $LCID_{NonIPPkts}$ in MAC PDU.

In this scenario, if the PDU is of any type other than IP (i.e. a Non IP packet), then the packet processing can have the following characteristics:
Source UE ID, Destination ID and $LCID_{NonIPPkts}$ identifies the created PDCP/RLC entity;
Header compression function is not applied (i.e. ROHC is applied) by the corresponding PDCP entity;
PDCP entity adds a PDU type in PDCP header. The PDU type distinguishes various types of non IP packets (e.g. ARP packets, Relay packets, discovery message, control signaling message etc.) wherein PDU type is different for each type of non IP packet;
Security is applied according to destination ID by the corresponding PDCP entity;
Small counter size can be used to have same size of header.

If the PDU is IP, then the packet format can have the following characteristics:
Source UE ID, Destination ID and LCID (from LCID set for IP packets) identifies the created PDCP/RLC entity;
Header compression function is applied (i.e. ROHC is applied) by the corresponding PDCP entity;
PDCP entity does not add PDU type in PDCP header. In one embodiment PDU type is added in PDCP header and set to IP packet.

Security is applied according to destination ID by the corresponding PDCP entity.

Similarly, the unique data/value can be associated with other PDU types as well. In that case, the packet formats can vary accordingly. It is to be noted that the packet format characteristics mentioned above can be changed as per requirements.

The various actions in method 300 can be performed in the order presented, in a different order or simultaneously. Further, in some embodiments, some actions listed in FIG. 3 can be omitted.

Figure 4:
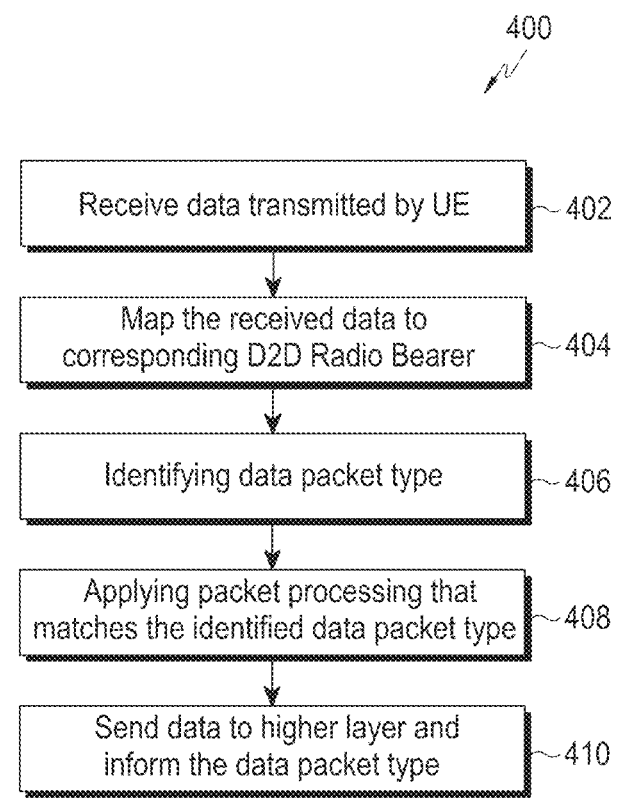
FIG. 4 is a flow diagram that depicts steps involved in the process of receiving at least one PDU data by the UE in the D2D communication network, as disclosed in the embodiments herein.

FIG. 4 is a flow diagram that depicts steps involved in the process of receiving at least one PDU data by the UE in the D2D communication network, as disclosed in the embodiments herein. The receiving UE 101b receives 402 the data transmitted by the transmitting UE 101a. The data is received on D2D communication link, at the receiving UE 101b, the receiving module 203 maps 404 the received data to corresponding D2D radio bearer (PDCP/RLC entity), wherein the corresponding D2D radio bearer is identified based on the combination of Source ID, Destination ID, and LCID present in the PDU header. The packet differentiator module 202 in the receiving UE 101b identifies the PDU type, by referring to the LCID type and/or PDU type field in the header associated with the PDU.

Based on the determined PDU type, the receiving UE 101b applies different actions to process the received data and indicates the determined PDU type along with processed data to higher layers For example, if PDU type is ARP then ROHC function is not applied whereas ROHC function is applied for data associated with PDU type equals IP.

In an embodiment, wherein the PDU type is a relay PDU, the receiving UE 101b relays the received PDU to wide area communication network i.e. it sends the PDU to base station. The receiving UE 101b maintains the mapping between the LCID (in LCID field of PDU header) of the PDU received from transmitting UE 101a on the D2D communication channel and the radio/EPS (Evolved packet system) bearer ID of the radio/EPS bearer on which the packet is sent to base station. The receiving UE 101b uses this mapping to determine the LCID for transmitting the packets received from the base station for the transmitting UE 101a. For example, receiving UE 101b receives a PDU from transmitting UE 101a wherein LCID field in PDU header is LCID and PDU type equals to relay PDU. Receiving UE 101b transmits this PDU to base station on Radio/EPS bearer ID equals RBID2/EPSBID2. Receiving UE 101b keeps a mapping of LCID1 to RBID2/EPSBID2. The receiving UE 101b receives a PDU from the base station, for transmitting UE 101a, on RBID2/EPSBID2. The receiving UE 101b determines that LCID1 should be used for transmitting this PDU to the transmitting UE 101a, based on the stored mapping. The receiving UE 101b maps this PDU to a D2D radio bearer corresponding to LCID1 while transmitting to the transmitting UE 101a on D2D communication network. The advantage is that if LCID is indication of priority then PDU received from the base station for the transmitting UE 101a can be applied same priority by the receiving UE 101b, as applied by the transmitting UE 101a, when sending the PDU to the receiving UE 101b, for relaying to the base station. In another embodiment, instead of RBID/EPSBID, the LCID can be mapped to a 5 tuple IP (i.e. SRC IP address in PDU received from the transmitting UE 101a, Destination IP address in PDU received from the transmitting UE 101a, Port number, Source IP address in PDU transmitted (re-layed) by the receiving UE 101b to base station, Destination IP address in PDU transmitted (relayed) by the receiving UE 101b to the base station). This is useful when PDUs of multiple LCIDs can be mapped to the same RBID/EPSBID while relaying to the base station. In an embodiment, if there is fixed mapping between LCID and packet priority, then the receiving UE 101b can indicate Packet Priority to higher layer for packet received from the transmitting UE 101a. The higher layer stores the mapping between Packet Priority and EPS bearer ID or IP 5 tuple. Further, the higher layer in the receiving UE 101b provides this Packet Priority to lower layers for packet received from the base station for relaying to the transmitting UE 101a.

Figure 6:
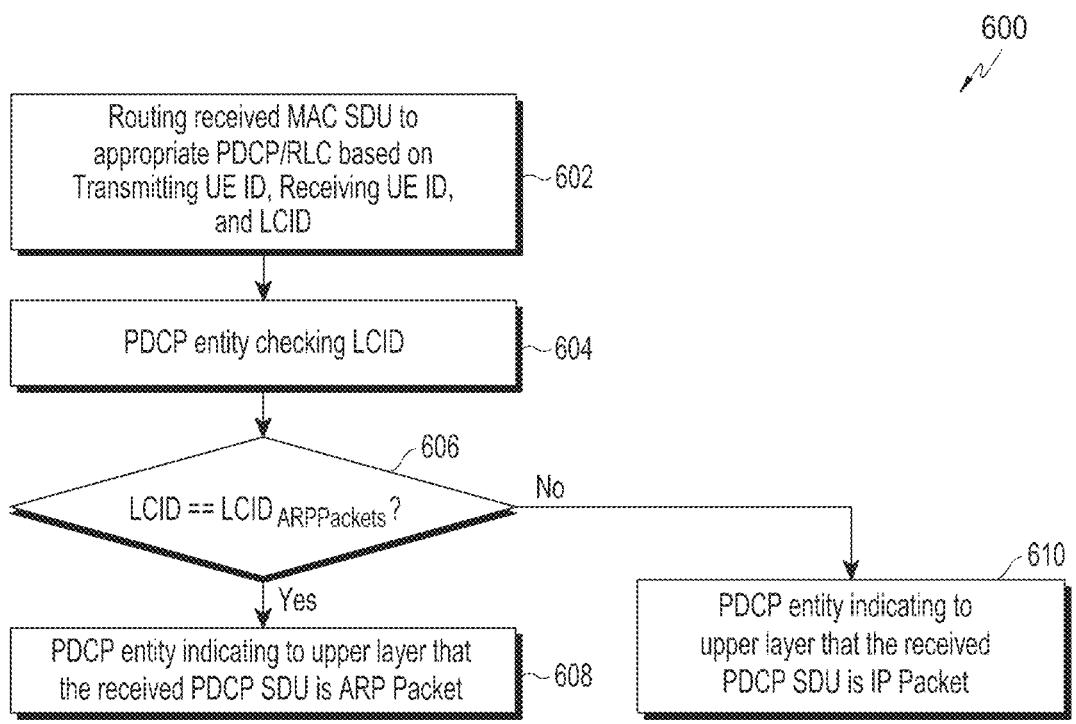
FIG. 6 is an example flow diagram that depicts steps involved in the process of differentiating ARP packets from other types of packets, by a receiving UE in the D2D communication network, as disclosed in the embodiments herein.

Receiver operation in a first embodiment: Assigning Separate Radio Bearer for ARP packets In this scenario as depicted in FIG. 6, the receiver module 203 of the receiving UE 101b receives data i.e. Medium Access Control Service Data Unit (MAC SDU), identifies the Packet Data Convergence Protocol (PDCP)/Radio Link Control (RLC) protocol, the data needs to be routed to, and routes 602 the MAC SDU to the identified PDCP. The PDCP checks 604 the LCID associated with the data. If the LCID is of $LCID_{ARPPackets}$ i.e. an LCID that represents ARP data, then the PDCP indicates 608 to the upper layer that the received PDCP SDU is an ARP packet. Further, the corresponding actions are applied to the data. Actions applicable if the LCID is of $LCID_{ARPPackets}$, or PDU type equals ARP are:

Header decompression function is not applied by PDCP entity;

Security is applied according to destination ID;

PDCP entity indicates to upper layer that received packet is ARP packet.

If the LCID associate with the received data is not $LCID_{ARPPackets}$, then the PDCP indicates 610 to the upper layer that the received PDCP SDU is an IP packet (In this scenario), and the corresponding actions are applied on the data. Actions applicable if the LCID is other than $LCID_{ARPPackets}$ or PDU type equals IP:

Header decompression function is applied by PDCP entity;

Security is applied according to destination ID;

PDCP entity indicates to upper layer that received PDCP SDU is IP packet.

Receiver operation in a second embodiment: Assigning Separate Radio Bearer for packets other than IP packets.

Figure 7:
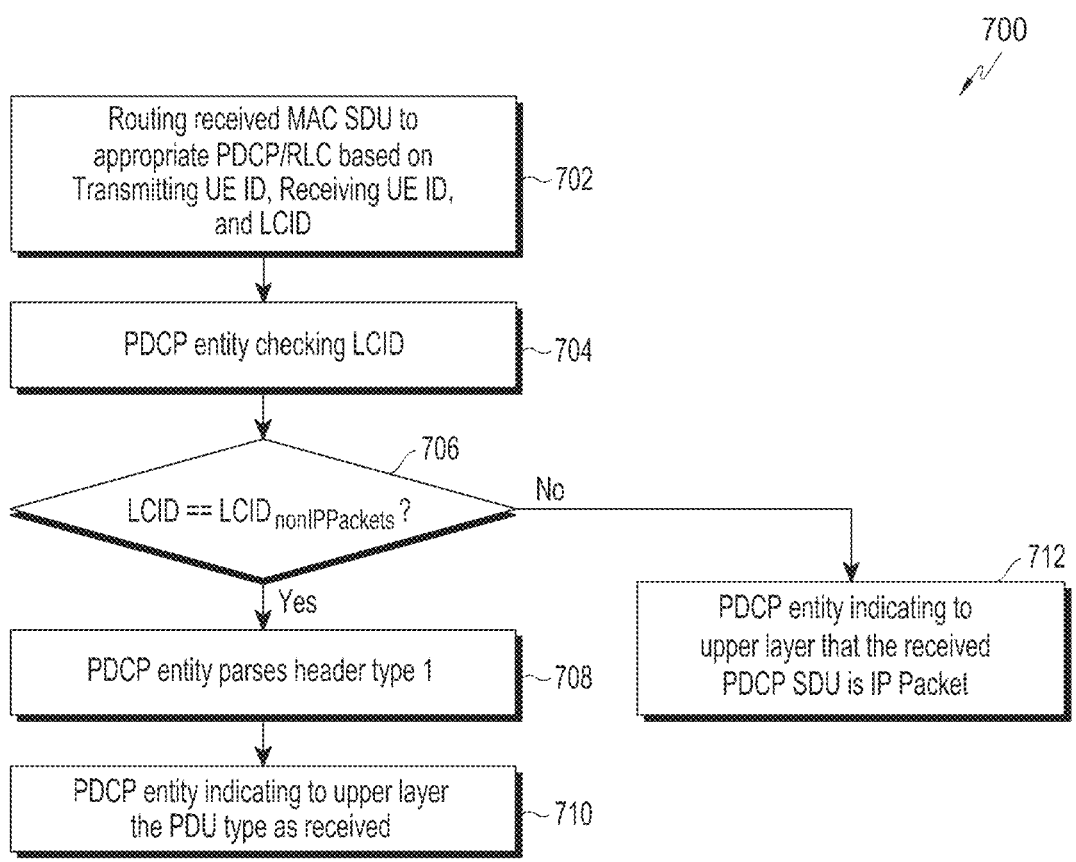
FIG. 7 is an example flow diagram that depicts steps involved in the process of differentiating Non Internet Protocol (Non IP) packets from Internet Protocol (IP) packets, by a receiving UE in the D2D communication network, as disclosed in the embodiments herein.

In this scenario as depicted in FIG. 7, the receiver module 203 of the receiving UE 101b receives data, i.e., MAC SDU, identifies the PDCP/RLC protocol, the data needs to be routed to, and routes 702 the MAC SDU to the identified PDCP. The PDCP checks 704 the LCID associated with the data. If the LCID is of $LCID_{NonIPPackets}$, i.e., an LCID that represents ARP data (in this scenario), then the PDCP parses 708 header type 1 and indicates 710 to the upper layer the PDCP SDU type of the received data. Further, the corresponding actions are applied to the data. Actions applicable if LCID indicates NonIP Packets i.e. LCID if of $LCID_{NonIPPackets}$.

PDCP entity does not apply header decompression function.

PDCP entity parses header type 1 (i.e. header with PDU Type).

PDCP entity parses the PDU type and PDCP entity indicates to upper layer the PDU type as received in the PDCP header.

If the LCID associate with the received data is not $LCID_{NonIPPackets}$, then the PDCP indicates 712 to the upper layer that the received PDCP SDU is an IP packet. Actions applicable if the LCID indicates IP Packets are:

PDCP entity applies header decompression function;

PDCP entity parses header type 2 (header without PDU Type);

PDCP entity indicates to upper layer that received PDCP SDU is IP packet.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein specify a mechanism for differentiating between different IP packets in a D2D communication network. The mechanism allows differentiation between different PDU packets, providing a system thereof. Therefore, it is understood that the scope of protection is extended to such a system and by extension, to a computer readable means having a message therein, the computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex. hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting data by a transmitting User Equipment (UE) in a Device to Device (D2D) communication network, the method comprising:
    obtaining a packet data convergence protocol (PDCP) service data unit (SDU) from a higher layer;
    identifying a type of the PDCP SDU;
    identifying whether to perform a header compression of the PDCP SDU using a robust header compression (ROHC) based on the type of the PDCP SDU; and
    transmitting a PDCP protocol data unit (PDU) comprising the PDCP SDU to a receiving UE,
    wherein a header of the PDCP PDU comprises information indicating the type of the PDCP SDU.

2. The method as claimed in claim 1, wherein the type of the PDCP SDU is one of an IP type or a non-IP type.

3. The method as claimed in claim 2,
    wherein in case that the type of the PDCP SDU is the IP type, the header compression of the PDCP SDU is performed using the ROHC, and
    wherein in case that the type of the PDCP SDU is the non-IP type, the header compression of the PDCP SDU is not performed.

4. The method as claimed in claim 1, further comprising:
    performing at least one security function for the PDCP PDU.

5. The method as claimed in claim 1, wherein the PDCP PDU is mapped into at least one D2D radio bearer.

6. A method for receiving data by a receiving User Equipment (UE) in a Device to Device (D2D) communication network, the method comprising:
    receiving a packet data convergence protocol (PDCP) protocol data unit (PDU) comprising a PDCP service data unit (SDU) and a header from a transmitting UE;
    identifying information indicating a type of the PDCP SDU included in the header; and
    identifying whether to perform a header decompression of the PDCP SDU using a robust header compression (ROHC) based on the type of the PDCP SDU.

7. The method as claimed in claim 6, wherein the type of the PDCP SDU is one of an IP type or a non-IP type.

8. The method as claimed in claim 7,
    wherein in case that the type of the PDCP SDU is the IP type, the header decompression of the PDCP SDU is performed using the ROHC, and
    wherein in case that the type of the PDCP SDU is the non-IP type, the header decompression of the PDCP SDU is not performed.

9. The method as claimed in claim 6, further comprising:
    performing at least one security function for the PDCP PDU.

10. The method as claimed in claim 6, wherein the PDCP PDU is mapped into at least one D2D radio bearer.

11. A transmitting user equipment (UE) for transmitting data in a Device to Device (D2D) communication network, the transmitting UE comprising:
    a transceiver; and
    a controller coupled with the transceiver and configured to:
        obtain a packet data convergence protocol (PDCP) service data unit (SDU) from a higher layer,
        identify a type of the PDCP SDU,
        identify whether to perform a header compression of the PDCP SDU using a robust header compression (ROHC) based on the type of the PDCP SDU, and
        transmit a PDCP protocol data unit (PDU) comprising the PDCP SDU to a receiving UE,
    wherein a header of the PDCP PDU comprises information indicating the type of the PDCP SDU.

12. The transmitting UE as claimed in claim 11, wherein the type of the PDCP SDU is one of an IP type or a non-IP type.

13. The transmitting UE as claimed in claim 12,
    wherein in case that the type of the data included in the PDCP SDU is the IP type, the header compression of the PDCP SDU is performed using the ROHC, and
    wherein in case that the type of the data included in the PDCP SDU is the non-IP type, the header compression of the PDCP SDU is not performed.

14. The transmitting UE as claimed in claim 11, wherein the controller is further configured to:
    perform at least one security function for the PDCP PDU.

15. The transmitting UE as claimed in claim 11, wherein the PDCP PDU is mapped into at least one D2D radio bearer.

16. A receiving user equipment (UE) for receiving data in a Device to Device (D2D) communication network, the receiving UE comprising:
    a transceiver; and
    a controller coupled with the transceiver and configured to:
        receive a packet data convergence protocol (PDCP) protocol data unit (PDU) comprising a PDCP service data unit (SDU) and a header from a transmitting UE;
        identify information indicating a type of the PDCP SDU included in the header; and
        identify whether to perform a header decompression of the PDCP SDU using a robust header compression (ROHC) based on the type of the PDCP SDU.

17. The receiving UE as claimed in claim 16, wherein the type of the PDCP SDU is one of an IP type or a non-IP type.

18. The receiving UE as claimed in claim 17,
    wherein in case that the type of the PDCP SDU is the IP type, the header decompression of the PDCP SDU is performed using the ROHC, and wherein in case that the type of the PDCP SDU is the non-IP type, the header decompression of the PDCP SDU is not performed.

19. The receiving UE as claimed in claim 16, wherein the controller is further configured to:

perform at least one security function for the PDCP PDU.

20. The receiving UE as claimed in claim 16, wherein the PDCP PDU is mapped into at least one D2D radio bearer.

\* \* \* \* \*